United States Patent
Harwood et al.

[11] Patent Number: 6,075,683
[45] Date of Patent: Jun. 13, 2000

[54] DISK DRIVE WITH PASSIVE MULTIPLE FLY HEIGHT SLIDER AND COOPERATIVE DISK PATTERN

[75] Inventors: Richard Fred Harwood, Rochester, Minn.; Ferdinand Hendriks, Yorktown Heights, N.Y.; Christopher Guild Keller, Albany, Calif.

[73] Assignee: International Business Machines Corporation, Armonk, N.Y.

[21] Appl. No.: 08/053,174

[22] Filed: Apr. 26, 1993

[51] Int. Cl.[7] .................................................. G11B 5/82
[52] U.S. Cl. ............................................................. 360/135
[58] Field of Search .............................. 360/135, 130.34, 360/86, 97.01; 369/275.4, 275.5, 277, 280

[56] References Cited

U.S. PATENT DOCUMENTS

| | | | |
|---|---|---|---|
| 4,366,993 | 1/1983 | Ono et al. | 308/9 |
| 4,553,184 | 11/1985 | Ogishima | 360/103 |
| 4,644,641 | 2/1987 | Verdone | 29/603 |
| 4,646,180 | 2/1987 | Ohtsubo | 360/103 |
| 4,802,042 | 1/1989 | Strom | 360/103 |
| 4,894,740 | 1/1990 | Chhabra et al. | 360/103 |
| 4,974,106 | 11/1990 | White et al. | 360/102 |
| 5,021,906 | 6/1991 | Chang et al. | 360/103 |
| 5,034,828 | 7/1991 | Ananth et al. | 360/75 |
| 5,047,884 | 9/1991 | Negishi et al. | 360/122 |
| 5,202,810 | 4/1993 | Nakamura et al. | 360/135 |
| 5,258,973 | 11/1993 | Iida | 360/135 |
| 5,302,434 | 4/1994 | Doerner et al. | 360/135 |

FOREIGN PATENT DOCUMENTS

| | | |
|---|---|---|
| 0 387 444 A2 | 9/1990 | European Pat. Off. . |
| 61-122967 | 6/1986 | Japan . |
| 63-152022 | 6/1988 | Japan ..................................... 360/135 |
| 1-98118 | 4/1989 | Japan ..................................... 360/135 |
| 2-110854 | 4/1990 | Japan ..................................... 360/135 |
| 4-11324 | 1/1992 | Japan ..................................... 360/135 |
| 4-38716 | 2/1992 | Japan ..................................... 360/135 |
| 4-141822 | 5/1992 | Japan ..................................... 360/135 |

OTHER PUBLICATIONS

"Head Parking Zone", Research Disclosure, Anonymous, Kenneth Mason Publications Ltd, England, Nov. 1988, 29563.

"Magnetic Disk Storage System With Structured Magnetic Head Slider", IBM Technical Disclosure Bulletin, vol. 27, No. 10A, New York, U.S., Mar., 1985, pp. 5820–5821.

*Primary Examiner*—David L. Ometz
*Attorney, Agent, or Firm*—Andrew J. Dillon

[57] ABSTRACT

A disk drive having a passive slider exhibiting two fly heights, one for recording and reading operations and a second for idling. The disk drive has a magnetic recording surface set for rotation in a direction. A transducer carrier is radially positionable relative to the magnetic recording surface and can be moved between recording portions and idling portions of the annular surface. In the idling zone the surface includes a plurality of shallow depressions disposed in an annular zone. The depressions are generally trench like. The orientation of the depressions depends on the type carrier for the transducer. If oriented transversely to the direction of rotation of the magnetic recording surface, they will boost pressure under the carrier increasing or introducing spacing between the body and the carrier. Where the carrier has an air bearing surface including regions creating zones of relatively negative pressure, the depressions are grooves paralleling the direction of rotation of the disk. The grooves diminish the effectiveness of the zones of negative pressure to increase carrier fly height.

7 Claims, 8 Drawing Sheets

DISK DRIVE WITH PASSIVE MULTIPLE FLY HEIGHT SLIDER AND COOPERATIVE DISK PATTERN

BACKGROUND OF THE INVENTION

1. Technical Field

The invention relates to direct access type magnetic storage systems including rigid disk drive systems and contact type read/record systems (e.g. floppy or diskette systems). More particularly the invention relates to apparatus for increasing fly height between a read head or slider and the recording media when positioned over a modified zone on the surface of the recording media.

2. Description of the Related Art

A disk drive (hard drive) is an information storage device which utilizes at least one rotatable magnetic disk to store information. The information is represented on the disk as a series of magnetically orientated regions. The magnetic regions are arrayed along the surface of the disk on either a plurality of concentric data tracks or spiral data tracks. Transducers generate magnetically orientated regions and sense such regions to store and read data on the disk.

In so-called hard drives, a transducer is mounted on a carrier called a slider. In operation, the slider flies just off the surface of the disk. Separation of the slider and disk reduces wear and consequent premature destruction of the components. An extremely low fly height of the slider is used to achieve high density data storage. High stability in fly height is required for accurate data storage, data signal reproduction and the avoidance of collision between slider and disk.

A slider flies as a result of the relative movement of the disk surface and the slider. This movement creates a cushion of air between the disk and the slider forcing the slider and the disk apart. The face of the slider toward the disk is known as the air bearing surface. Design of a slider air bearing surface, a suspension system for the slider and an actuator arm for slider positioning are directed to achieving a low mass assembly and a high degree of positional stability of the slider for a broad range of disk drive unit operating conditions.

The suspension system provides dimensional stability between the slider and the actuator arm by compensating for the force of the air between the air bearing surface and the disk surface as well as providing rapid motion damping of the slider following repositioning from one rack to another. The suspension system should control slider position relative to its directions of motion between tracks while resisting out-of-plane movement relative the preferred fly height above the disk surface. At no time during data read or write operations of the drive should the slider come into contact with the disk surface. The suspension typically comprises a load beam attached to the actuator arm and a flexure which connects the slider to the load beam. The load beam balances the slider by counteracting the lifting force from the spinning disk. The flexure supports the slider and allows flexibility during the slider's ride on the cushion of air.

A slider for a rigid disk drive is passive if its design automatically produces a constant fly height without active detection and correction. Common features of air bearing surfaces designed for passive devices are two air bearing rails running the length of the outside edges (i.e. the edges parallel to the direction of motion) of the slider. The slider may also include a tapered front edge. A Winchester slider adds a third rail centered between the outside edge rails. In positive pressure devices, the rails are separated by non air bearing surfaces. A read and write transducer is fabricated on the rear edge of the slider.

Reducing slider fly height is limited by head-disk interactions which increase as the slider gets closer to the disk. As the number of head disk interactions increase, the reliability of the system decreases. Head disk interactions may be caused by, for example, debris on the disk, on the slider, or by disk asperities.

A slider which reduces the number of head-disk interactions has greater reliability. Reducing the number of head-disk interactions has been accomplished by providing active devices in which a slider flies low during a read or write operation and returns to a higher, safer height between read/write operations. A disk drive generally includes a number of read/write heads, each mounted on a separate slider. A specific head is normally used for reading or writing less than 1 percent of the time. Thus, programmable designs have provided a substantial increase in reliability when compared to designs wherein the read/write head flies low all the time. However, they have the disadvantage of greater complexity.

Magnetic hard disk systems are usually permanently sealed and do not accept transferable disks. Transferable disks, such as used in floppy drives, are used in what are termed contact recording systems. A floppy drive uses diskettes, which in turn comprise a flexible disk housed in a plastic jacket. The plastic jacket has an inner liner of a nonwoven fabric facing the flexible disk. The liner wipes the surface of the disk clean as it rotates. Both sides of the flexible disk are covered with a particulate magnetic media (e.g. magnetic iron oxide suspended in a resin). In single sided drives, a spherical recording head is opposite a felt pad that urges the disk against the recording head. In two sided recording, a pair of head have opposing flat surfaces with reliefs running along their entire length, similar to a two rail slider for a hard disk system. While the heads are urged toward the recording media, the characterization of them as contact systems is only partially true. In many floppy disk drive designs contact between head and recording surface is intermittent. Contact between media and head is still undesirable because it results in wear of the read/write head over the long term. Recording head wear is a source of long term unreliability in contact recording systems having high speed, continuously spinning media.

Intermediate systems which utilize rigid media and contact recording are also known. The foregoing comments are also applicable to these systems.

SUMMARY OF THE INVENTION

Other objects, features and advantages will be apparent in the written description of the invention that follows. The invention provides a disk drive having a passive slider exhibiting two fly heights, one for read and write operations and a second higher level for idling without increasing disk speed. The disk drive has a magnetic recording surface set for rotation in a direction. A transducer carrier is radially positionable relative to the magnetic recording surface and can be moved between recording portions and idling portions of the annular disk surface. In the idling zone the surface includes a plurality of depressions disposed in an annular zone. The depressions are generally trench like and have variable depths. The orientation of the depressions depends on the type carrier for the transducer. If oriented transversely to the direction of rotation of the magnetic recording surface, they will boost pressure under the carrier increasing or introducing spacing between the surface and the carrier. Where the carrier has an air bearing surface with regions creating zones of relatively negative pressure, the depressions are circumferential grooves. The grooves diminish the effectiveness of the zones of negative pressure thus increasing carrier fly height.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

The drawings are not intended as a definition of the invention but are provided solely for the purpose of illustrating one of the preferred embodiments of the invention described below.

DESCRIPTION OF THE INVENTION

Figure 1:
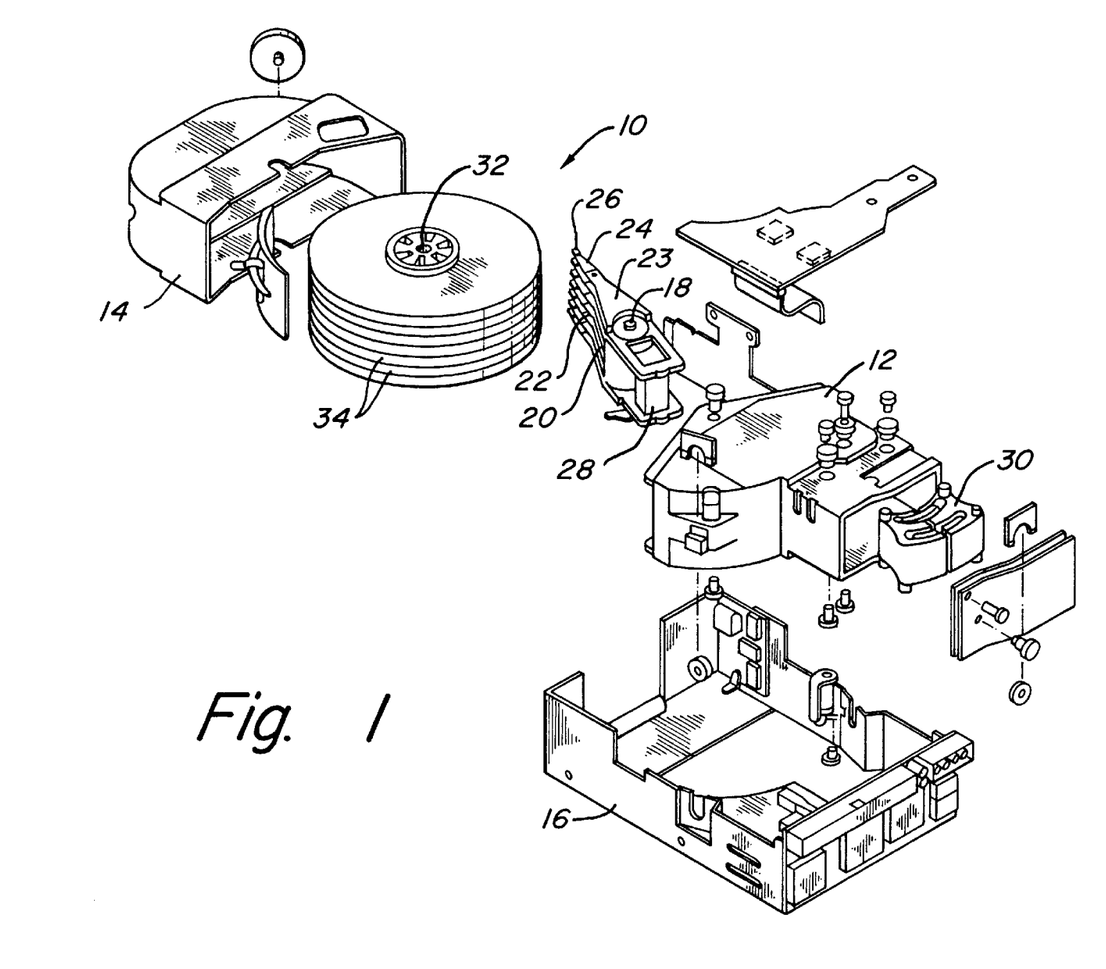
FIG. 1 is an exploded view in perspective of a disk drive having rigid disks.
Figure 2:
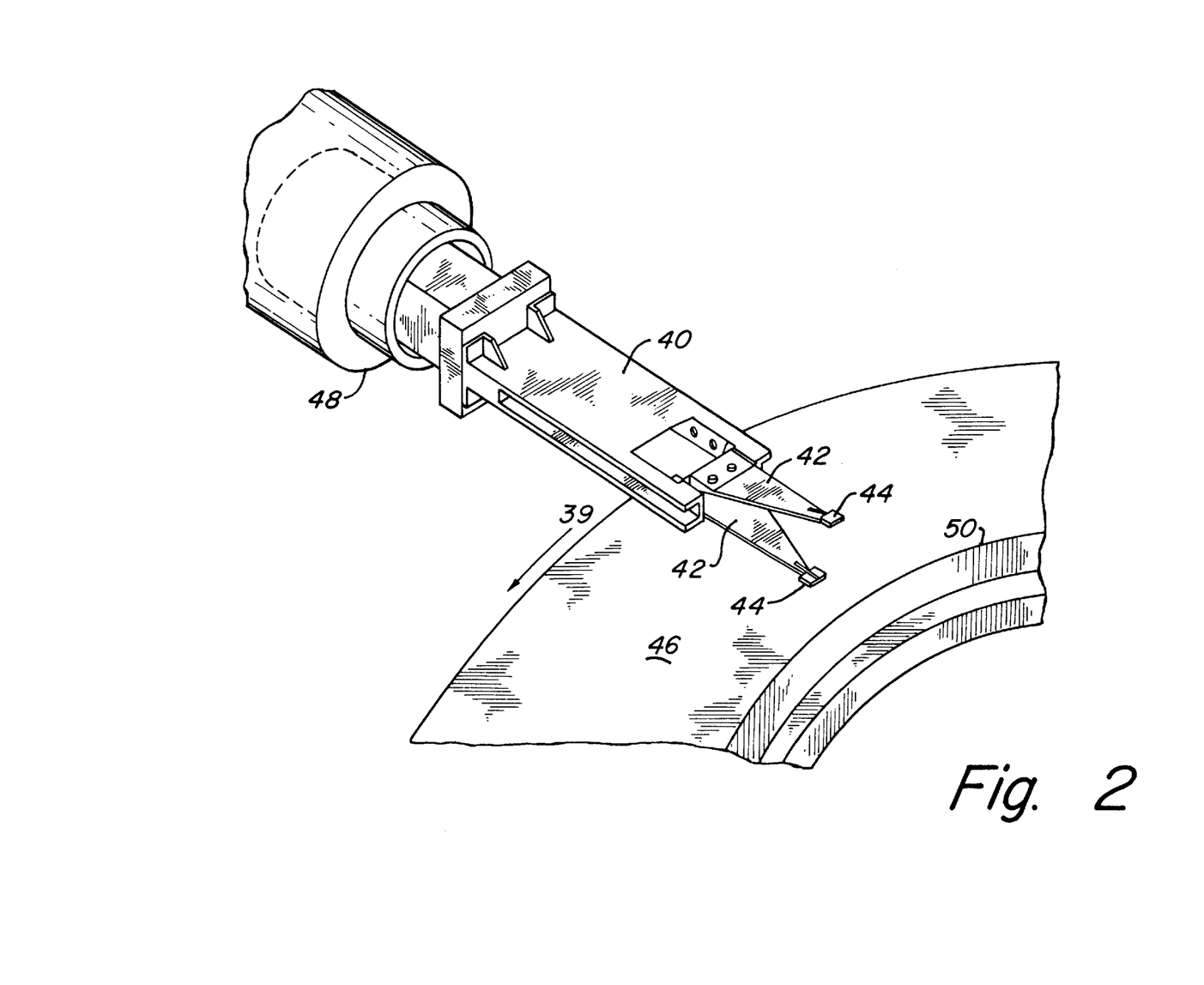
FIG. 2 is a perspective view of a magnetic disk data storage system.

FIG. 1 is an exploded view of a disk drive 10. It should be noted that although a rotary actuator is shown, the invention described herein is also applicable to linear actuators (as illustrated in FIG. 2). The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22 are load springs 24. In this case, the load springs form the suspension. Attached at the end of each load spring is a slider 26 which carries a pair of magnetic transducers or the head. The transducers may be of an inductive type, or may include a read transducer of a magnetoresistive type. On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator arm assembly 20 to rotate it about the actuator shaft 18. Also mounted within the housing 12 is a spindle shaft 32. Rotatably attached to the spindle shaft 32 are a number of disks 34. In FIG. 1, eight disks are attached to the spindle shaft 32. As shown in FIG. 1, the disks 34 are attached to the spindle shaft 32 in spaced apart relation. An internal motor (not shown) rotates the disks 34.

With reference to FIG. 2, a magnetic disk storage system comprises a magnetic head arm 40 with at least one magnetic head suspension assembly 42. In the embodiment shown, one magnetic head suspension assembly 42 is attached to the top of the head arm and another magnetic head suspension assembly 42 is attached to the bottom of the head arm 40. Each suspension assembly supports at its end a head slider 44, and each head slider 44 has one or more magnetic transducers, generally called magnetic heads, disposed so that the transducing gap of the head may be in transducing relation with magnetic disk surface 46. Electrical signals are conducted from the magnetic heads to a host system for use in the host system. Head arm 40 is attached to a conventional actuator 48 such as a voice coil motor, for example, for accessing the magnetic heads to various tracks on the magnetic disk surface 46.

An annular, fly height control surface 50 is disposed on a radially inward portion of magnetic disk surface 46. Control surface 50 is located on the inner part of surface 46 to minimize loss of recording space. Unlike the rest of magnetic disk surface which is smooth, surface 50 is etched to modify lift produced by slider 44. The particular etch pattern selected depends upon the type of the air bearing surface used by slider 44.

Figure 3A:
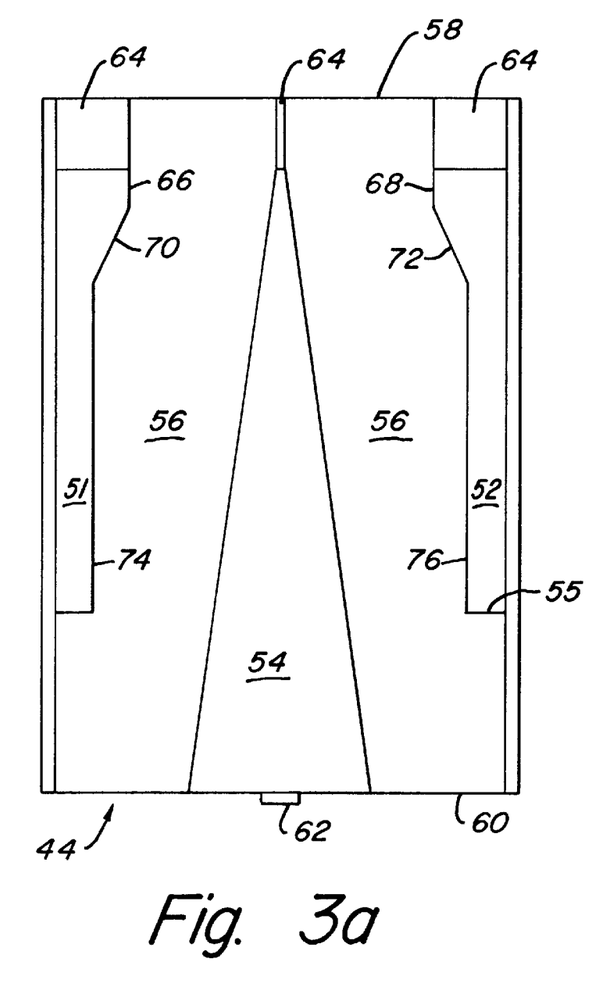
FIG. 3A is a bottom plan view of a slider having a positive pressure air bearing surface.
Figure 3B:
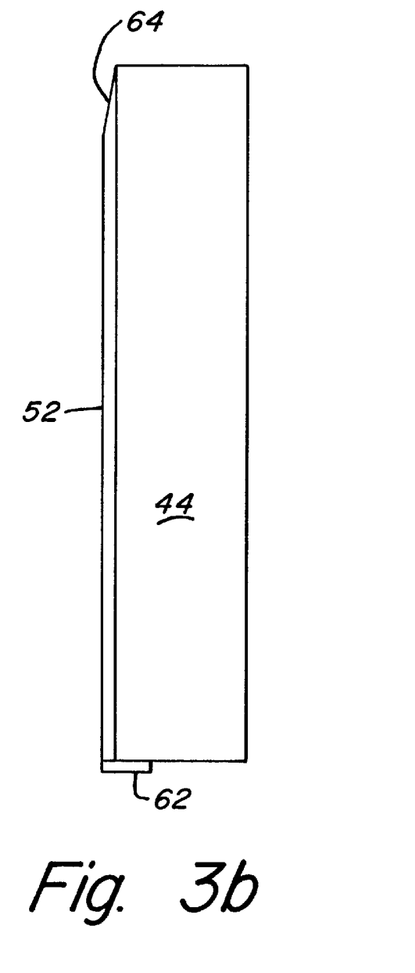
FIG. 3B is a view in side elevation of the slider of FIG. 3A.

Air bearing surfaces include positive pressure types and negative pressure types. FIGS. 3A and 3B illustrate a positive pressure air bearing surface (ABS) for slider 44. Arrows indicate the direction of the movement of air along the surface. The ABS is formed using two side rails 51 and 52 and a center rail 54. The inner sides of the side rails 51 and 52 and the sides of the center rail 54 border on recessed sections 56 into one face of slider 44. Recessed sections 56 are formed by etching, ion milling, or other machining techniques. The recessed sections 56 extend from the leading edge 58 of the slider to the trailing end 60 of the slider. Both side rails 51 and 52 and center rail 54 have tapered height sections 64 adjacent leading edge 58.

The side rails 51 and 52 are widest at the leading edge 58 of the slider. Side rails 51 and 52 do not extend all the way to the trailing end of the slider. Side rails 51 and 52 are generally narrower at their trailing end than at the leading edge. Other shapes of the side rails may also be suitable so long as they maintain a relatively high pressure at the leading edge 58 of the slider and a relatively lower pressure in the middle area of the slider.

Each of the side rails includes wide sections 66 and 68 at leading edge 58 of the slider which have substantially parallel sides and flared sections 70 and 72. Flared sections 70 and 72 extend to a break point after which are located narrow sections 74 and 76, which having substantially parallel sides and a width that is less than the width of wide sections 66 and 68. Narrow sections 74 and 76 extend to the end of the side rails. Side rail edges may be made nonparallel to improve operation at varying skew angles.

Center rail 54 comprises a taper section 64 at the leading edge 58 of the slider. Its width is small at the leading edge and increases progressively toward the trailing end 60 of the slider. Should any contaminants be present in the air adjacent to the ABS 55 of slider 44 the shape of the center rail causes the contaminants to be directed along recesses 56. In this way contaminants are moved away from the transducer 62 at the trailing end of the center rail 54.

Slider 44 has different pressure zones. Positive pressure is provided under the various rails, partly in proportion to their width. Pressurization of ABS 55 results from the relative motion between disk and slider and creates lift which balances the suspension load.

A magnetic transducer 62, preferably of the thin film type, is located on trailing end 60 of the center rail with its transducing gap flush with the rail surface.

Figure 4:
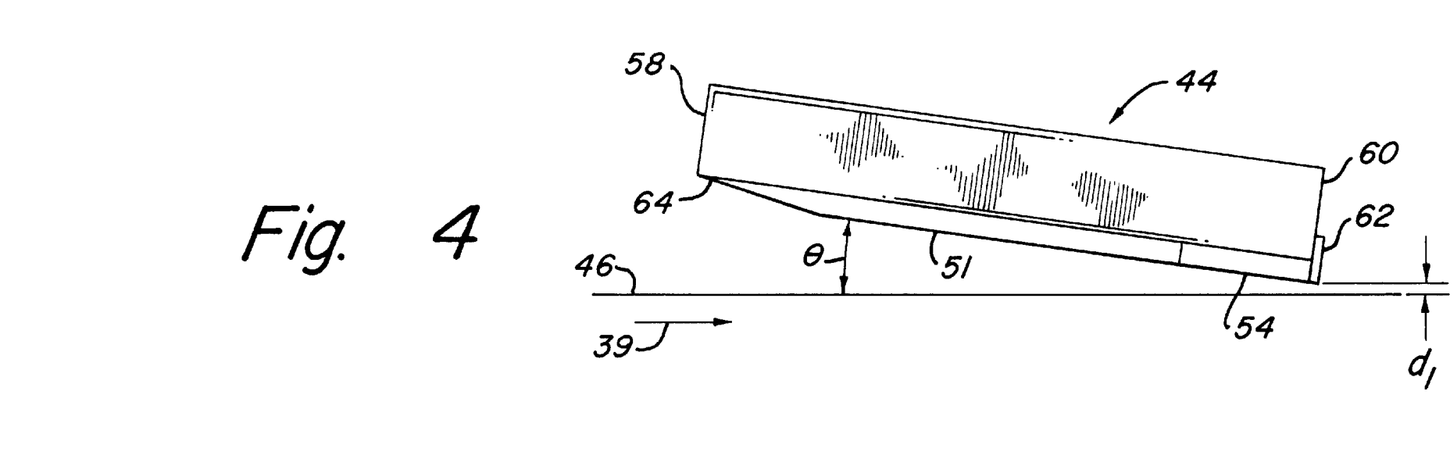
FIG. 4 is a side elevation view of the slider of FIG. 3.
Figure 5A:
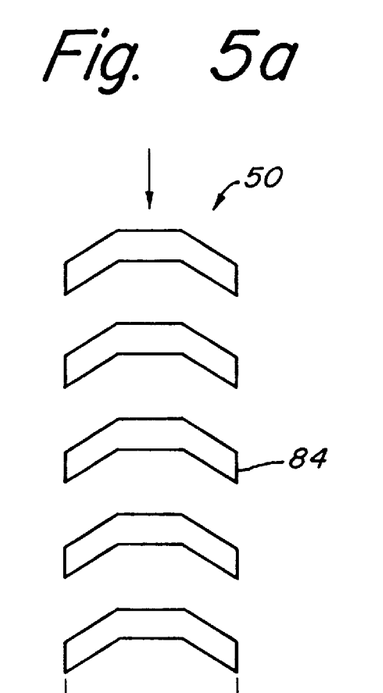
FIGS. 5A–D are top and side views of herringbone disk etch patterns showing possible transition regions.
Figure 5B:
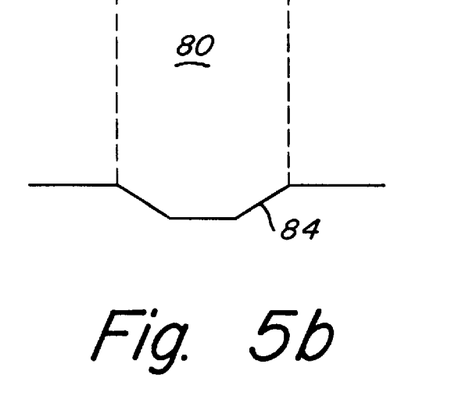
Figure 5C:
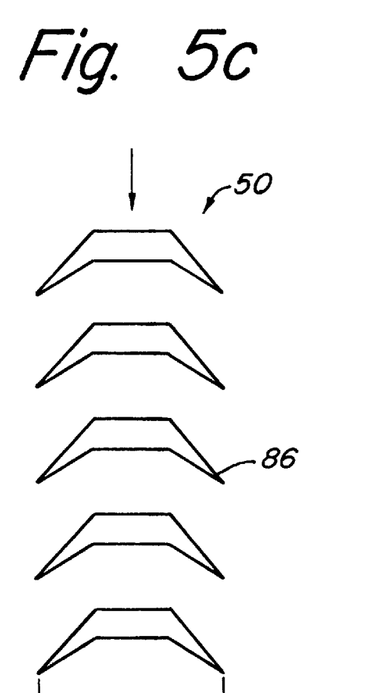
Figure 5D:
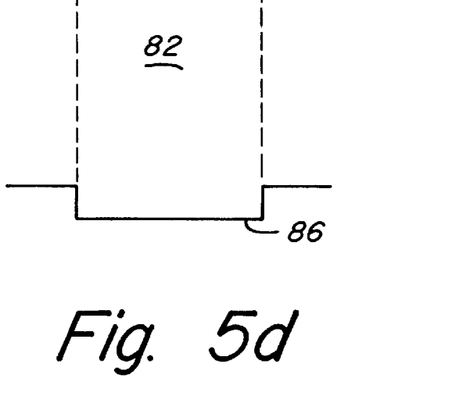

FIG. 4 illustrates the flying attitude of positive pressure slider 44 when positioned over the smooth, data storage portion of magnetic disk surface 46. The air bearing surface is designed so that the slider 44 flies at a desired pitch angle $\Theta$ relative to a moving magnetic disk surface 46. In this attitude the trailing end 60 of slider 44, where the transducer is mounted, is closest to the disk surface and assured to be spaced at a flying height distance d from the magnetic recording medium.

Greater lift is generated by center rail 54 at its trailing end than at its leading edge. The trailing end is also the minimum spacing location d with respect to the disk surface. This provides a balanced equilibrium with the greater lift generated by the side rails near the leading edge of the slider. The pressure from the side rails is high at the leading edge of the slider due to the taper sections 64 and the greater width of the side rails at the leading edge of the slider. The pressure profile along the side rails increases up to the taper, decreases slightly after the taper, and slightly increases up to a point just in front of the trailing edge of the rails, where the pressure falls off to ambient pressure. The center rail 54 generates very little pressure at the leading end 58 of the slider, but generates progressively increasing lift in the direction of the trailing end 60 of the slider, reaching a maximum near the trailing end. The resulting combined pressure profile produces high lift near the leading edge 58 of the slider 44, relatively low lift in the middle of the slider, and relatively high lift near the trailing end 60 of the slider.

Annular fly height control surface 50 provides a grooved or notched surface texture for modifying the flying characteristics of a slider. The character of surface 50 depends upon the design of the air bearing surface of the slider. The particular surface texture used for control surface 50 is coupled to an air bearing surface design so that increased fly heights are achieved for positive pressure sliders, negative pressure sliders, as well as contact recording headers. For a positive pressure slider 44, increasing the spacing d between the trailing end 60 and magnetic disk surface 46 is provided by increasing pressure under all parts of the positive air bearing surface, but especially under a center rail.

FIGS. 5A–D illustrate two preferred track patterns 80 and 82 used to implement an annular fly height control surface 50 for a positive pressure slider. The tracks have been straightened for purposes of illustration. An arrow indicates the direction of movement of the tracks relative to a slider. Tracks 80 and 82 comprise a plurality of notches 84 and 86, respectively, laid out in a herring bone pattern with one notch following the other. The notches are oriented to be transverse to the direction of travel of the magnetic disk surface and are shaped to have one roughly convex side and one concave side. Notches 84 are of constant width while notches 86 have a concave face which is shallower than the convex face. Notch 84 is variable in depth, with shallower ends and a deeper center, while notch 86 is of constant depth.

As the disk drive turns, air is compressed in the notches 84 and 86. Air compressed under positive pressure sliders tends to leak out from under sides of the exterior rails. Viscous effects created by the relative motion of the disk and slider, combined with the shape and depth of the notches 84 and 86 cause additional compression of air under the slider ABS when positioned over the track, thus lifting the slider higher. The gradual introduction of lift to a slider moving to a position over surface region 50 may be required to insure stability of the slider. This is done by varying the depth or the width of notches in a track. Rapid changes in lift may cause loss of stability in a slider. In an alternative embodiment, multiple depth buckets placed in the disk surface are disposed so as to capture and compress air under the slider ABS when the slider flies over the cooperative disk zone.

Figure 6:
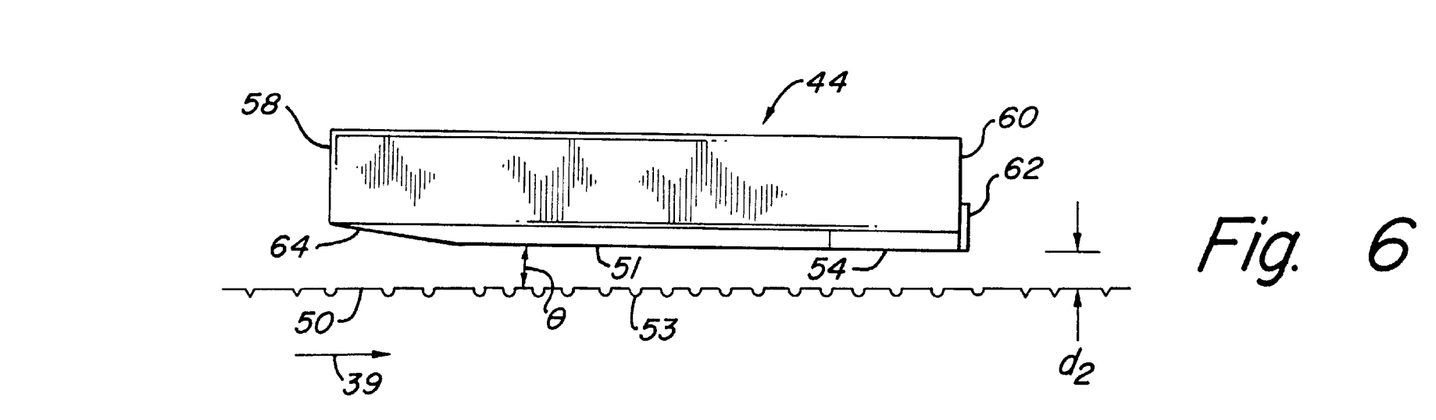
FIG. 6 is a side elevation view of the slider flying above a textured zone.

In use, the fly height $d_2$ between the trailing end 60 and a disk increases as it moves to a position over surface 50, as illustrated in FIG. 6. The depth of notches 84 can range from less than 0.3 to 2.0 microns but preferably falls between 0.5 to 1.0 microns under the slider. Notches 86 are preferably of a uniform depth between 0.5 and 1.0 microns. Fly height of a positive pressure slider is increased about 50% from its usual 75 to 100 nanometer range to reduce the possibility of collision between slider and disk surface.

Figure 7A:
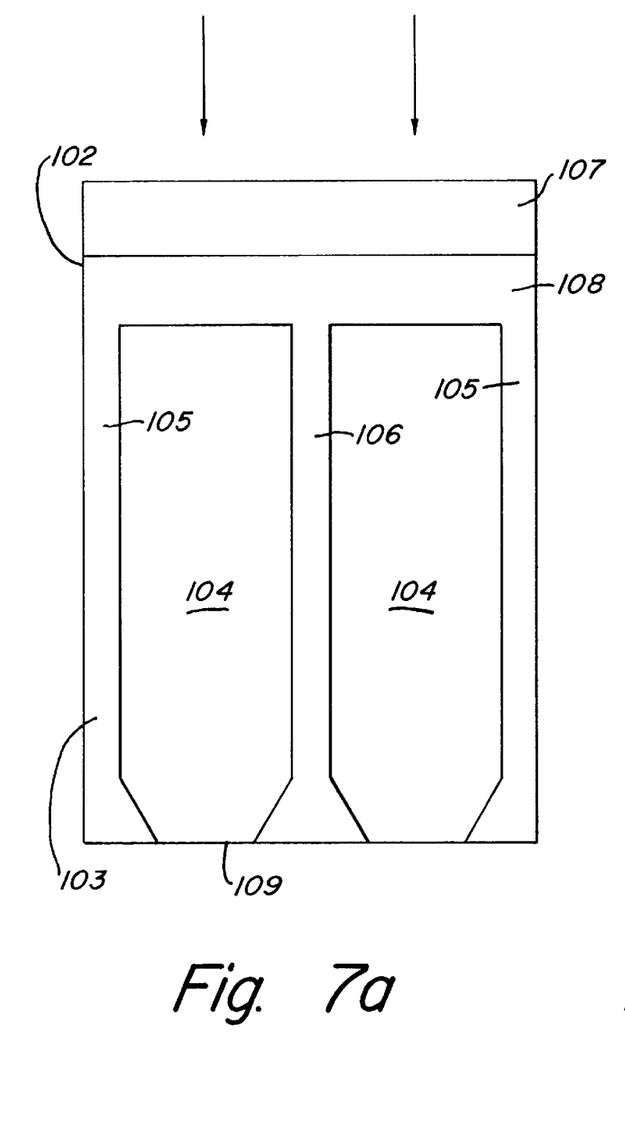
FIGS. 7A and 7B are bottom plan and side elevation views of a negative pressure slider, respectively.
Figure 7B:
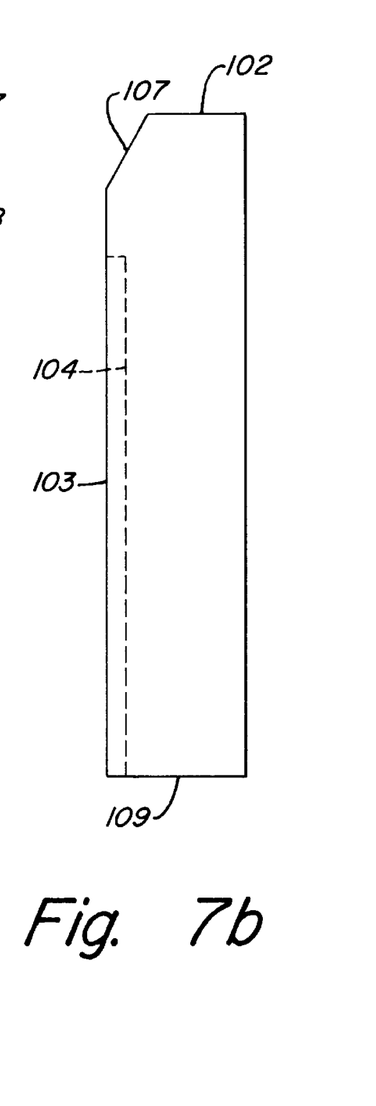

FIGS. 7A and B depict a negative pressure slider 102. Negative pressure slider has an air bearing surface 103 on which surfaces 104 developing negative pressure are offset by positive pressure exterior rails 105 and center rail 106. Slider 102 has a sloped leading edge 107 designed to generate positive lift and a positive air pressure bearing surface 108 directly behind leading edge 107. Surfaces 104 are recessed from the plane of exterior rails 103, center rail 106 and positive pressure air bearing surface 108, but open to a trailing edge 109.

Figure 8:
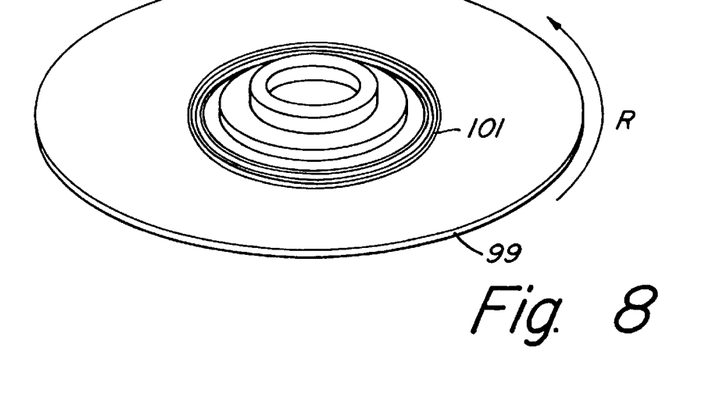
FIG. 8 is a perspective view of a magnetic storage disk.

FIG. 8 illustrates a disk 99 having an annular fly height control surface 101 intended for use with a slider having negative (relative to ambient) pressure regions on an air bearing surface. An outer portion of the disk surface of disk drive 100 is intended for recording of data and the radially inward part including surface 101 is intended to increase lift during parking of a slider. Control surface 101 has a plurality of annular grooves disposed near the center of disk 99.

Figure 9:
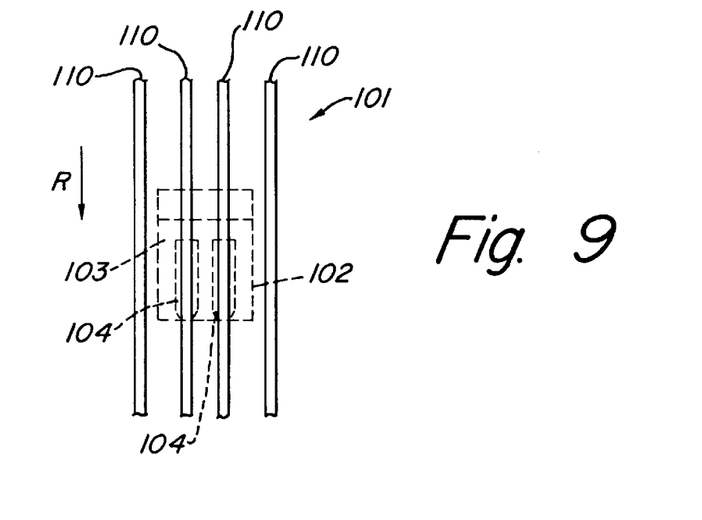
FIG. 9 is a plan view of a region of a magnetic recording surface with a shadow plan view of an air bearing surface for a slider superimposed thereon for a negative pressure slider and cooperative disk pattern.

FIG. 9 illustrates a parked slider 102 over control surface 101. Annular surface 101 comprises a plurality of annular grooves 110 etched into the surface of the disk drive media. Grooves 110 are at least 6.0 microns in depth where slider 102 is parked.

Air bearing surface 103 of slider 102 includes two negative pressure regions 104, which are notches extending from the trailing edge of slider 102 forward. In use, positive pressure over ambient forms under the air bearing surface except in regions 104. Negative pressure forms in regions 104, which at the preferred fly height, counteracts the positive pressure underlying the remainder of the air bearing surface at the desired fly height. This arrangement promotes stability in the fly height.

When negative pressure regions 104 are moved over grooves 110 their effect is spoiled. A greater volume of air is passed through the notches under the leading edge 107 of the slider raising the pressure in the negative pressure regions. In effect, grooves 110 divide negative pressure regions 104 into isolated subregions. By increasing the pressure in the negative pressure regions, the fly height of slider 102 is increased.

Figure 10:
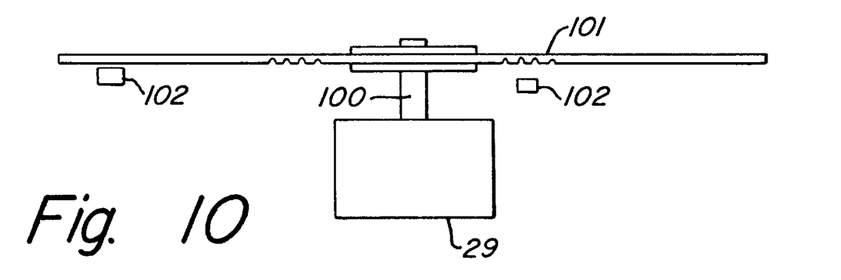
FIG. 10 is a cross sectional view of the storage disk of FIG. 8.
Figure 11A:
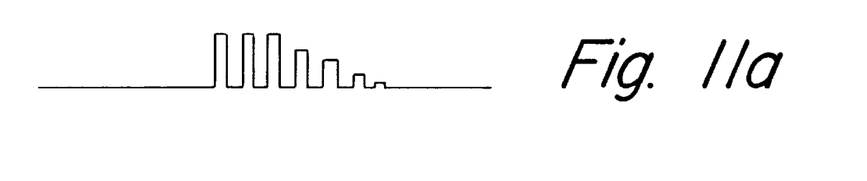
FIGS. 11A and 11B are a graphical illustration of indentation groove depths and widths, illustrating possible transition zones.
Figure 11B:
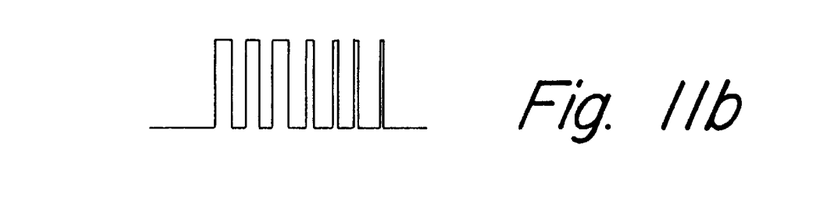

FIG. 10, which is a section view, illustrates the result. Slider 102 flies closer to the surface of disk 100 away from surface 101. FIGS. 11A and 11B chart groove depth against radial distance. For FIG. 11A the deepest grooves are those closest to the axial center of drive 100 between $r_1$ and $r_2$. Shallower grooves extend radially outwardly from $r_2$ to $r_3$ to provide a transition region for the slider. The distance from $r_2$ to $r_3$ may exceed the distance from $r_1$ and $r_2$. In FIG. 11B the grooves are all of equal depth, but become narrower moving outwardly from $r_2$ to $r_3$ to provide a transition region.

Figure 12:
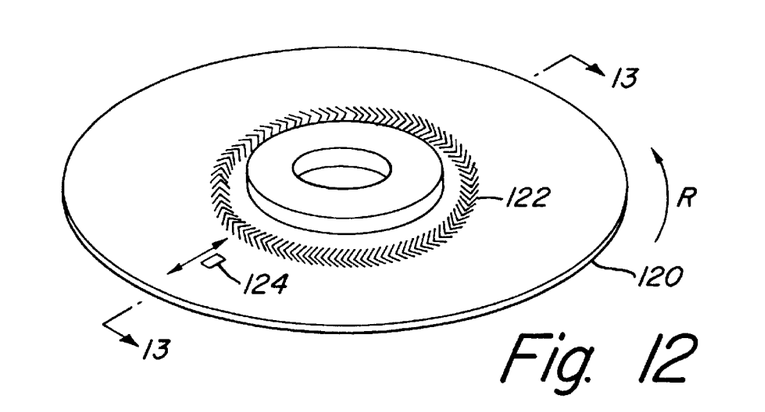
FIG. 12 is a perspective view of a rigid or non-rigid data storage disk.

FIG. 12 illustrates a disk drive 120 having an intermittent contact transducing head 124 such as the Censtor "Flexhead" available from Censtor, 530 Race Street, San Jose, Calif. 95139. The flexhead is designed to run in contact with the recording surface of disk drive 120, but in practice the transducer head usually flies at an average height of 25 to 50 nanometers with frequent contact between the head and the disk surface. The magnetically open face of the transducing head 124 is essentially smooth. An annular fly height control surface 122 causes head 124 to fly at a greater average height and substantially eliminate intermittent contact between head and recording surface. Contact head 124 is depicted as disposed over a radially outward portion of disk drive 120 intended for recording of data. Arrows indicate the radial directions of movement for head 124. Surface 122 is intended for head parking during drive operation. Contact head 124 may be centered over the center line of surface 122.

Figure 13:
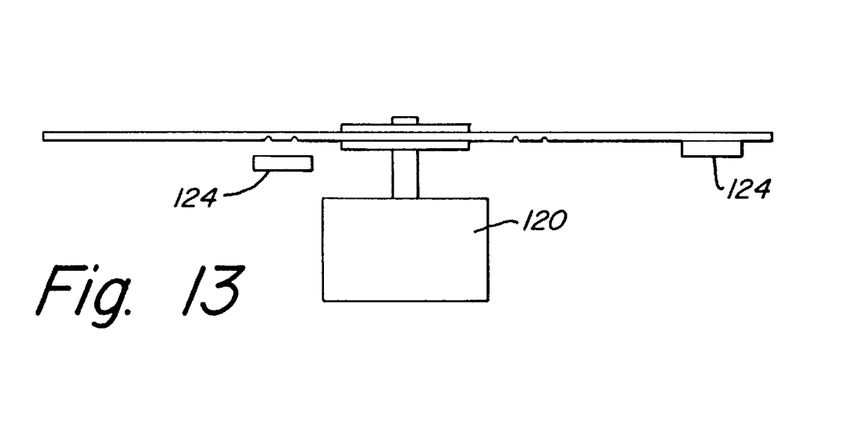
FIG. 13 is a cross sectional view of the storage disk of FIG. 12 taken along section lines 13—13.

Surface 122 is a herring bone notch pattern. When a contact head is centered over surface 122, in a parking position, individual notches of the pattern extend out from under both edges of head 124. The movement of contact head 124 relative to the disk increases pressure. By increasing the pressure under the head 124, its fly height is increased. A floppy disk for disk drive 120 is generally made of a flexible material. Surface 122 may be formed by stamping or during molding of the disk. FIG. 13, which a view taken along section line 12—12 of FIG. 12, illustrates the result of the notch pattern 122 on a moving contact head 124.

All embodiments of the invention extend the life of recording components in disk drives. The gain comes from reducing the frequency of occurrence of contact between transducer and disk. Reduced contact results from the increasing fly height of the head or slider during periods where no read or write operation occurs. The increased fly height is achieved using a passive device, eliminating the complexity added by active fly height control systems.

While the invention has been particularly shown and described with reference to a preferred embodiment, it will be understood by those skilled in the art that various changes in form and detail may be made therein without departing from the spirit and scope of the invention.

What is claimed is:

1. A direct access storage system comprising:
   a disk drive having a first annular surface adapted for rotation;
   a transducer head mounted to a slider having an air bearing surface facing said first annular surface and having a subambient pressure generating region wherein lift is generated upon relative movement of said slider and said first annular surface;
   a data storage region within said first annular surface, said data storage region having a substantially smooth surface wherein a selected amount of lift is generated upon relative movement of said slider and said data storage region; and
   an idling region within said first annular surface, said idling region having a plurality of depressions therein comprising a plurality of channels aligned with a direction of rotation of said first annular surface for passing air to said subambient pressure generating region wherein said plurality of channels are grouped on a radially inwardly portion of said first annular surface and wherein each channel has a selected depth which is greater than the depth of an adjoining channel which is radially outward therefrom wherein a transition region between said idling region and said data storage region is provided wherein an amount of lift greater than said selected amount of lift is generated upon relative movement of said slider and said idling region, resulting in a greater separation between said transducer head and said first annular surface within said idling region.

2. The direct access storage system according to claim 1 wherein said plurality of channels are grouped on a radially inward portion of said first annular surface and wherein each channel has a selected width which is greater than the width of an adjoining channel which is radially outward therefrom wherein a transition region between said idling region and said data storage region is provided.

3. The direct access storage system according to claim 1 wherein said air bearing surface includes a plurality of rails which generate an increase in pressure over ambient between said air bearing surface and said first annular surface.

4. A direct access storage system comprising:
   a disk drive having a first annular surface adapted for rotation;
   a transducer head mounted to a slider having an air bearing surface facing said first annular surface and having a plurality of rails which generate an increase in pressure over ambient between said air bearing surface and said first annular surface wherein lift is generated upon relative movement of said slider and said first annular;
   a data storage region within said first annular surface, said data storage region having a substantially smooth surface wherein a selected amount of lift is generated upon relative movement of said slider and said data storage region; and
   an idling region within said first annular surface, said idling region having a plurality of depressions comprising a plurality of indentations arranged in a herringbone pattern therein wherein an amount of lift greater than said selected amount of lift is generated upon relative movement of said slider and said idling region, resulting in a greater separation between said transducer head and said first annular surface within said idling region.

5. A direct access storage system comprising:
   a disk drive having a first annular surface adapted for rotation;
   a transducer head mounted to a slider having an air bearing surface facing said first annular surface and having a plurality of rails which generate an increase in pressure over ambient between said air bearing surface and said first annular surface wherein lift is generated upon relative movement of said slider and said first annular;

a data storage region within said first annular surface, said data storage region having a substantially smooth surface wherein a selected amount of lift is generated upon relative movement of said slider and said data storage region; and an idling region within said first annular surface, said idling region having a plurality of depressions comprising a plurality of indentations running substantially transverse to the direction of rotation of said first annular surface wherein an amount of lift greater than said selected amount of lift is generated upon relative movement of said slider and said idling region, resulting in a greater separation between said transducer head and said first annular surface within said idling region.

6. A direct access storage system comprising:

a disk drive having a first annular surface adapted for rotation;

a transducer head mounted to a slider having an air bearing surface facing said first annular surface and having a plurality of rails which generate an increase in pressure over ambient between said air bearing surface and said first annular surface wherein lift is generated upon relative movement of said slider and said first annular;

a data storage region within said first annular surface, said data storage region having a substantially smooth surface wherein a selected amount of lift is generated upon relative movement of said slider and said data storage region; and an idling region within said first annular surface, said idling region having a plurality of depressions therein wherein an amount of lift greater than said selected amount of lift is generated upon relative movement of said slider and said idling region, resulting in a greater separation between said transducer head, wherein said transducer head is a contact or intermittent contact read/write head.

7. A direct access storage system comprising:

a disk drive having a first annular surface adapted for rotation:

a transducer head mounted to a slider having an air bearing surface facing said first annular surface and having a plurality of rails which generate an increase in pressure over ambient between said air bearing surface and said first annular surface wherein lift is generated upon relative movement of said slider and said first annular;

a data storage region within said first annular surface, said data storage region having a substantially smooth surface wherein a selected amount of lift is generated upon relative movement of said slider and said data storage region; and an idling region within said first annular surface, said idling region having a plurality of depressions therein wherein an amount of lift greater than said selected amount of lift is generated upon relative movement of said slider and said idling region resulting in a greater separation between said transducer head and said first annular surface within said idling region, wherein said transducer head operates as a contact or intermittent contact read/write head when operated over said substantially smooth surface of said data storage region, but operates as flying head when positioned over said idling region, with continuous high speed rotation of said first annular surface.

* * * * *